United States Patent
Raiche

(10) Patent No.: US 6,729,883 B1
(45) Date of Patent: May 4, 2004

(54) NUMERIC TEACHING DEVICE

(76) Inventor: Molly Raiche, 1464 Guildford Dr., Bourbonnais, IL (US) 60914

( * ) Notice: Subject to any disclaimer, the term of this patent is extended or adjusted under 35 U.S.C. 154(b) by 0 days.

(21) Appl. No.: 10/331,430

(22) Filed: Dec. 30, 2002

(51) Int. Cl.[7] .............................. G09B 19/02; G09B 1/00
(52) U.S. Cl. ........................ 434/206; 434/188; 434/210
(58) Field of Search .................................. 434/188, 197, 434/198, 199, 206, 210, 216

(56) References Cited

U.S. PATENT DOCUMENTS

| | | | | |
|---|---|---|---|---|
| 1,305,724 A | * | 6/1919 | Kennedy | 434/195 |
| 1,392,578 A | * | 10/1921 | Jones | 434/203 |
| 1,457,223 A | * | 5/1923 | Gallup | 434/198 |
| 2,476,580 A | | 7/1949 | Bergman | 35/77 |
| 2,533,569 A | * | 12/1950 | Espinola | 235/87 R |
| 2,804,699 A | * | 9/1957 | Robinson | 434/208 |
| 2,945,303 A | | 7/1960 | Parkhurst | 35/9 |
| 3,283,420 A | * | 11/1966 | Schott | 434/205 |
| 3,360,874 A | * | 1/1968 | Myers | 434/198 |
| 3,722,110 A | | 3/1973 | Morrisey | 35/30 |
| 4,176,474 A | * | 12/1979 | O'Sullivan | 434/210 |
| 4,280,291 A | * | 7/1981 | Maynes | 40/495 |
| 4,295,832 A | | 10/1981 | Karell | 434/168 |
| 4,685,116 A | * | 8/1987 | Toumayan | 377/51 |
| 4,838,579 A | * | 6/1989 | McRoberts | 283/48.1 |
| 4,856,998 A | | 8/1989 | Silas | 434/210 |
| 4,902,230 A | | 2/1990 | Jones | 434/206 |
| 5,423,682 A | | 6/1995 | Hildebrandt | 434/195 |

* cited by examiner

Primary Examiner—Kurt Fernstrom
(74) Attorney, Agent, or Firm—Denison & Assoc, PC; Joanne Denison

(57) ABSTRACT

The present invention consists of a numeric teaching device having a plurality of spinning wheels mounted on an axle and a decimal point indicator appearing between two groups of spinning wheels, with each spinning wheel containing the digits 0 through 9 printed on the outer annular surface of the spinning wheel in columnar form so that when the wheels are spun, different numeric formulations may be created by the user of the device. The axle containing the spinning wheels is supported by three dowel rods secured to a wood base, with each dowel rod further having a cradle at its upper end for communicating with the axle. The device is especially important in teaching numeric place values, numeration or the formation of numbers, and the rounding of numbers.

9 Claims, 1 Drawing Sheet

NUMERIC TEACHING DEVICE

FIELD OF THE INVENTION

The present invention relates to the field of teaching devices, and more particularly those which are suited to teaching the rounding and sequence of numbers.

BACKGROUND OF THE INVENTION

Currently, in the marketplace, there are available a wide variety of device having numbers imprinted upon their surfaces for the purpose of teaching young learners place value, rounding and naming numbers. For example, U.S. Pat. No. 2,476,580 issued to J Bergman discloses the use of an educational device with four wheels plus a plus sign and an equal sign for the purpose of teaching equations to children.

U.S. Pat. No. 2,945,303 issued to R. Parkhurst discloses a device having five elongate wheels with a plurality of columns of numbers printed thereupon and a housing with a multiplication sign and an equals sign for the purpose of teaching multiplication to children.

U.S. Pat. No. 3,722,110 issued to M. Morrisey teaches the use of a device for assisting the user in converting numbers from one base numeration system to another wherein the device has numbers imprinted upon elongate wheels in exponential form.

U.S. Pat. No. 4,295,832 discloses the use of a novel educational toy which is provided with a suspension rod mounted between two handle elements wherein the suspension rod is capable of supporting a plurality of disk elements, each having numbers and/or letters imprinted on the surface of the disks for the purpose of teaching sentence structure or equation structure.

U.S. Pat. No. 4,856,998 issued to L. Silas teaches the use of a hand held sign having parts comprised of flat boards having numbers printed on the surface for the purpose of teaching numeric value and decimal values. However, no rotating wheels are used in this teaching device.

U.S. Pat. No. 4,902,230 issued to S. Jones teaches the use of a plurality of wheels, each wheel having a sequence of 12 numbers printed on each wheel, or a mathematic function printed on the wheel, such as =, +, × or ÷, for the purposes of teaching arithmetic equations to children.

U.S. Pat. No. 5,423,682 issued to R. Hildebrant, discloses the use of a device to teach counting to young children which has four adjacent stacks of nine blocks which are slidably mounted on respective rods held in a frame, with each of the nine blocks further having one face of each block in the stock imprinted in order with a cardinal number while the other stocks are marked with one, two and three zeros to the left of the cardinal number appearing thereupon.

Thus, nowhere in the prior is seen a simplified device for the teaching of rounding and numeric valuation having a series of numeric wheels each containing a series of numbers from 0 to 9 imprinted on the face of each wheel, and further having a decimal indicating means located between two adjacent wheels wherein a child may easily envision how numbers are named, constructed and how to properly round a number up or down.

SUMMARY OF THE INVENTION

The present invention consists of a numerical rounding or teaching device which is provided with six or more spinning wheels mounted within a housing or upon an axle which communicates with a stand to support the entire device upon a flat surface. Positioned between the third and fourth wheel from the left is provided a stick with a colored tip, preferably red or orange, which juts forth from the axle and which represents the decimal point. Each wheel is approximately four inches in diameter or height and is labeled sequentially with digits 0–9, spaced evenly apart. The wheel/axle assembly set in a support device consisting of a plywood base with three dowel rods having cradles at each of their upper ends which communicates with the axle. In one preferred embodiment of the present invention, each wheel has differently colored numbers printed on the surface of each wheel. For example, the hundreds wheel may have a white background with blue numbers. The tens wheel may have a white background with pink numbers and the ones wheel may be provided with a white background with red numbers. To the right of this wheel is the decimal point, as described above. The following wheel is the tenths wheel with the reverse coloring scheme of a pink background with white numbers. Next, the hundredths wheel has a blue background with white numbers and finally, the thousandths wheel is provided with an orange background with white numbers. Of course, the device may be provided with more or fewer numbers to the left or right of the decimal point, as desired by the teacher using the device.

The entire device may be constructed of wood, for an improved appearance, or it may even be economically constructed from hard plastic or other polymer. It may even be constructed entirely from cardboard and paper composite products for a very inexpension version of the device.

The decimal point tip of the stick indicator may be colored red, pink or orange or another bright color for easy visual identification by the young student. A wide variety of colors may be used to represent the numbers on the device, as well as the background for the numbers, as long as there is sufficient disparity in coloration between the background and the numbers printed thereupon. The wheel may be either be completely round and smooth in appearance, or it may be segmented into 10 flat surfaces to accommodate the digits 0 through 9.

In one preferred embodiment of the present invention, the wheels may be secured to a rod which is suspended within a housing made from either cardboard, plastic or even wood, which allows for easy storage and portability of the device.

In such a manner the present invention may be used in arithmetic instruction to acquaint young learners with value, rounding and naming numbers. The juxtaposition of number coloring and background coloring may assist some learners in reinforcing number place value. The use of a physically manipulative device may be very helpful in assisting learners that respond well to abstract concepts by use of physical movements.

OBJECTS OF THE INVENTION

Thus, it is one primary object of the present invention to provide a numerical rounding or teaching device which is provided with six or more spinning wheels having imprinted upon each wheel's surface the digits 0 through 9 for the purpose of allowing young student to easily spin each wheel to learn number naming, place value and rounding by spinning the wheels.

It is yet an additional primary object of the present invention to provide a numerical rounding or teaching device with a plurality of spinning wheels with a decimal stick having a brightly colored tip positioned between one of the wheels wherein a young learner can spin the wheels and learn naming, place value and rounding of numbers containing decimal values.

It is yet a further primary object of the present invention to provide a numerical rounding or teaching device having a plurality of spinning wheels with the digits 0 through 9 imprinted upon each wheel wherein the color of the digit is in stark contrast to the background and all of the backgrounds of the numbers to the left of the decimal point are of a color which is opposite that of the backgrounds of the numbers to the right of the decimal point.

It is still an additional primary object of the present invention to provide a numeric rounding or teaching device having a plurality of spinning wheels with the digits 0 through 9 imprinted upon each wheel wherein the wheels are approximately 4" in height or diameter for easy manipulation by young learners.

Yet a further primary object of the present invention is to provide a numeric rounding or teaching device having a plurality of spinning wheels with the digits 0 through 9 imprinted upon each wheel where the wheels are removably retained upon an axle and the axle is supported by three dowel rods each having upper support cradles communicating with the axle, and a lower end which is secured in a plywood base.

Still an additional primary object of the present invention is to provide a numeric rounding or teaching device having a plurality of spinning wheels with the digits 0 through 9 imprinted upon each wheel whereby the wheels, dowel rods and lower support base may be made from plastic or another polymer for cost effective manufacture and construction.

And yet a further primary object of the present invention is to provide a numeric rounding or teaching device having a plurality of spinning wheels with the digits 0 through 9 imprinted upon each wheel whereby the wheels are supported on an axle and the axle is mounted within a housing for easy use and storage of the device.

These and other objects and advantages of the present invention can be readily derived from the following detailed description of the drawings taken in conjunction with the accompanying drawings present herein and should be considered as within the overall scope of the invention.

DETAILED DESCRIPTION OF THE DRAWINGS

Figure 1:
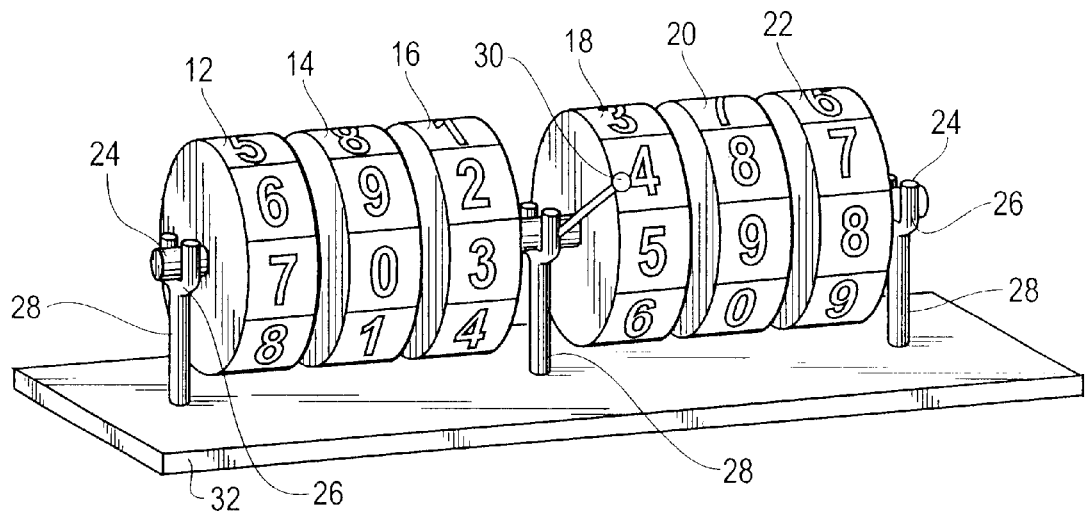
FIG. 1 is a perspective view of the present invention showing six spinning wheels with digits 0 through 9 imprinted upon each wheel and the spinning wheels are mounted upon an axle supported by three dowel rods mounted in a plywood base.

Shown now in FIG. 1 is numeric teaching device 10 having a plurality of spinning wheels hundreds wheel 12, tens wheel 14, ones wheel 16, tenths wheel 18, hundredths wheel 20 and thousandths wheel 22 which are supported on axle 24 which rests securely in cradle 26. Cradle 26 is positioned at the top of dowel support rods 28 which are secured within plywood base 32. In addition, a decimal indicator stick or rod is mounted to center dowel rod support 28. Printed on each of wheels 12, 14, 16, 18, 20 and 22 are the digits 0 through 9 so that a young learner may easily rotate the wheels to create any number desired, or as requested by the teacher. In this particular preferred embodiment of the present invention, three dowel rod support elements 28 are used to support the spinning wheels 12, 14, 16, 18, 20 and 22, although more or fewer support rods 28 may be used. When a center support dowel rod 28 is not utilized, the decimal point indicator may be a fixed rod extending directly from the plywood base 28, or it may consist of a separate stationary wheel with a dot imprinted on its surface.

In this particular preferred embodiment of numeric teaching device 10, each of the components of spinning wheels 12, 14, 16, 18, 20, 22, the dowel support rods 26, the decimal point indicator 30 and the base 32 are made from wood. However numeric teaching device 10 may be made from hard plastic or other polymer for economy and ease of manufacture. Other materials may be utilized as well, including metals and metal alloys.

It is further contemplated that the numbers imprinted on each of the spinning wheels 12, 14, 16, 18, 20 and 22 may be made from a color that highly contrasts with the background color. For example, hundreds wheel 12 may have a white background with blue numbers and the tens wheel 14 may be provided with a white background with pink numbers. The ones wheel 16 may have red numbers with a white background. As a contrast, then the tenths wheel 18 has white numbers with a pink background and the hundredths wheel 20 has white numbers with a blue background while the thousandths wheel has white numbers with an orange background. In such a manner, when a young learner spins each of the wheels, it is easy for the child to distinguish the different places to either the left or right of the decimal point. Further, it is simple for the young child to understand the concept of round a number up or down because visual clues become readily apparent.

The decimal place indicator 30 is provided with a highly colored tip, such as red or orange or pink or any color with high contrast so that the young learner becomes readily acquainted with the concept of numbers to the left or right of a decimal point. In this preferred embodiment of the present invention, the decimal indicator 30 is mounted to support rod 28.

Figure 2:
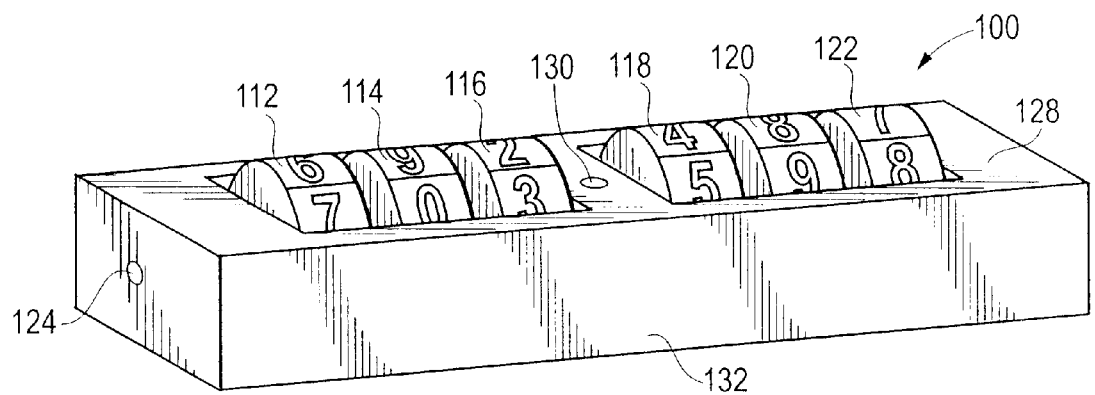
FIG. 2 is a perspective view of an additional preferred embodiment of the present invention showing the five spinning wheels mounted in a housing.

FIG. 2 shows yet an additional preferred embodiment of the present invention, numeric teaching device 100 wherein the some series or set of spinning wheels is encapsulated into housing 132. In this particular embodiment, hundreds wheel 112, tens wheel 114, ones wheel 116, tenths wheel 118, hundredths wheel 120 and thousandths wheel 122 are mounted upon axle 124 for easy rotation and manipulation by a young learner. A decimal point indicator 130 is easily printed between the two sets of wheels in the center of the device. Again, it is anticipated that decimal indicator 130 is made from a high contrast color such as pink or orange or red, to provide easy visual indication of the decimal point for the young learner. In this particular embodiment of the present invention, the entire device may be made from wood or plastic. Or, for a very economical version of the present invention, the entire device may be made from cardboard or a composite paper product.

In such a manner, a very simple yet useful device is shown which readily teaches the concepts of learning naming numbers, place value recognition, decimal concepts and the rounding of numbers. Such a device is especially important to children with learning disabilities or those that learn more readily from physical manipulation and/or strong visual clues.

Although in the foregoing detailed description the present invention has been described by reference to various specific embodiments, it is to be understood that modifications and alterations in the structure and arrangement of those embodiments other than those specifically set forth herein may be achieved by those skilled in the art and that such modifications and alterations are to be considered as within the overall scope of this invention.

What is claimed is:

1. A numeric teaching device having a plurality of spinning wheels with an outer annular surface, with each spinning wheel having a sequential series of digits from 0 through 9 spaced evenly apart appearing on the outer annular surface, axle means for rotatably securing the spinning wheels adjacent one another, a decimal point indicator positioned adjacent one of the spinning wheels and support means for supporting the axle retaining the spinning wheels so that the spinning wheels may rotate freely to formulate different numeric values.

2. The numeric teaching device according to claim 1 wherein the support means comprises at least two dowel rods each having a top portion and a bottom portion and a cradle, where the cradle is mounted to the top portion of each dowel rod.

3. The numeric teaching device according to claim 2 wherein the support means is mounted to a base and the bottom portion of each dowel rod is secured to the base.

4. The numeric teaching device according to claim 1 wherein the decimal point indicator comprises an elongate slender stick with a colored tip.

5. The numeric teaching device according to claim 1 wherein the support means comprises a housing.

6. The numeric teaching device according to claim 5 wherein the housing has four upstanding sidewalls, a rear wall and a front wall.

7. The numeric teaching device according to claim 6 wherein each of the walls is substantially planar.

8. The numeric teaching device according to claim 5 wherein the axle is supported by the sidewalls of the device.

9. The numeric teaching device according to claim 6 wherein the decimal indicator is a colored dot appearing on the front wall of the device.

* * * * *